July 11, 1961 O. M. HOFFMAN 2,992,317
ELECTRICALLY HEATED ICE-REMOVAL APPARATUS
Filed Oct. 14, 1957 2 Sheets-Sheet 1

INVENTOR.
OLIN M. HOFFMAN
BY Dwight L. Moody
ATTY.

United States Patent Office 2,992,317
Patented July 11, 1961

2,992,317
ELECTRICALLY HEATED ICE-REMOVAL APPARATUS
Olin Miller Hoffman, Akron, Ohio, assignor to The B. F. Goodrich Company, New York, N.Y., a corporation of New York
Filed Oct. 14, 1957, Ser. No. 689,980
19 Claims. (Cl. 219—46)

The invention relates to electrically heated apparatus for preventing the accumulation of ice upon a surface and especially to such apparatus for aircraft surfaces such, for example, as the leading edges of wings, fins and the like.

Heretofore, flexible coverings of rubber or other elastomeric material pneumatically inflatable tubes therein have been used successfully to remove ice from the leading edges of wings and other airfoils of aircraft having flight speeds, for example, in the order of about 500 miles per hour. However, these pneumatically distensible rubber coverings, when used on aircraft with speeds in the 600 to 700 or more miles per hour range, generally suffer objectionable abrasion, erosion and cutting of the rubber by rain drops, sleet and small ice particles impinging against the coverings. Prior electrically heated, flexible coverings of rubber or other elastomeric material with circular in section, solid or stranded wire, heating elements embedded in the rubber body of the covering may suffer breakage of the heating wires and also objectionable abrasion, erosion and cutting by rain drops and the like at high aircraft speeds. Anti-icing systems in which hot air is circulated through the interior of the wing at its leading edge have been relatively heavy and maintenance of such systems has been difficult.

The principal objects of the invention are to provide an improved electrically heated ice-removing apparatus or means overcoming the foregoing difficulties of the said prior devices, and to provide an improved, integral, electrically heated leading edge portion adapted for separable attachment as a whole to the remainder of an airfoil.

Other objects of the invention are to provide for increased resistance to erosion, abrasion, cutting, aging, and electrical failure of the said apparatus and of the said heated leading edge portion; to provide an electrically heated, relatively rigid, thin ice-removing apparatus of reduced weight suitable especially for use on airplanes with speeds in excess of 500 miles per hour; to provide for convenience of installation and replacement of the apparatus as a whole and of the heated leading edge portion as a whole; and to provide for minimum power requirements for effective heating of the apparatus.

Still other objects of the invention are to provide for preventing breakage of the heating elements as from thermal expansion of the apparatus; to provide for minimum chordwise flow of heat from the apparatus to adjacent airfoil structure and for maximum outward thermal conductance in the apparatus itself; to provide for continuity of heating throughout a section or area of the apparatus intermediate opposite margins thereof; to provide for intermittently and momentarily heating adjacent sections or areas of the apparatus and for selective sequential heating of these areas especially from the outboard end toward the inboard end of the apparatus; to provide for laterally continuous heating at a narrow zone extending substantially from margin to margin at each end of the apparatus; to provide for an apparatus or a leading edge portion of integral, reinforced plastic, laminated construction and predetermined curved sectional shape having thinness, lightweight, structural strength, limited flexibility yet inherent rigidity, and increased electrical insulating and thermal conductance characteristics; and to provide for simplicity of construction, convenience of manufacture and attachment and for effectiveness of operation.

These and other objects and advantages of the invention will be apparent from the following description.

In the accompanying drawings which form a part of this specification and in which like numerals are employed to designate like parts throughout the same.

Figure 1:
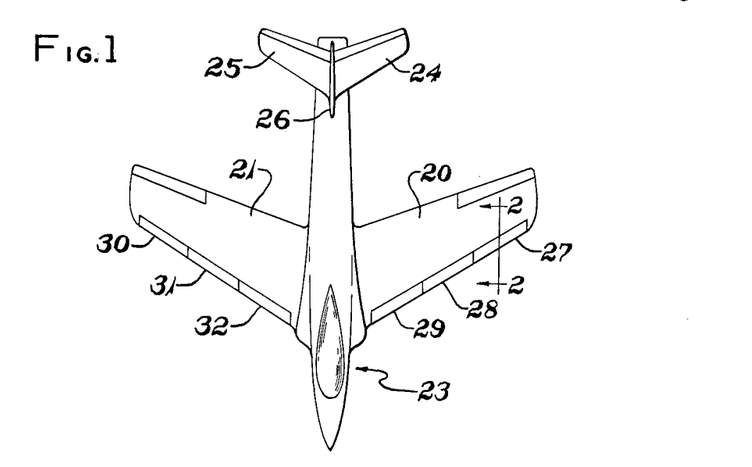
FIG. 1 is a view showing a plurality of electrically heated ice-removing apparatus or means mounted on an airplane and constructed in accordance with and embodying the invention.

The illustrative embodiment of the invention as shown in FIG. 1 is applied to the leading edges of swept-back wings 20, 21 of a high-speed, jet-engine powered airplane 23. However, the invention is also suitable for the leading edges of tail fins or surfaces 24, 25, 26 and for other elements of the airplane, as well as for non-aeronautical application, where it is desired to prevent accumulation of ice. Wing 20 may be provided with three, individual, electrically heated apparatus or means 27, 28, 29 arranged in series along the leading edge in end-to-end abutting relationship, while wing 21 may be provided with three, individual, electrically heated apparatus or means 30, 31, 32 of corresponding construction and arrangement along the leading edge, as shown in FIG. 1. The construction and arrangement of each apparatus 27 to 32, inclusive, is the same except, for example, as to size, shape and chordwise coverage; hence only the apparatus 27 will be described in detail.

Figure 2:
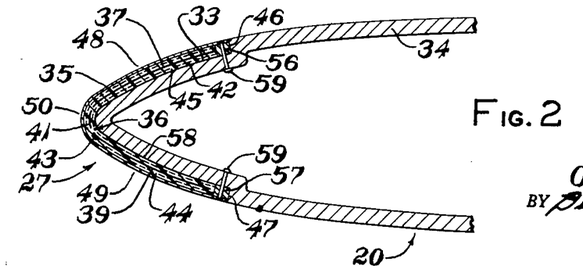
FIG. 2 is a sectional view taken along line 2—2 of FIG. 1 showing the apparatus mounted in the recessed leading edge of a wing, parts being broken away.

The apparatus or means 27 is adapted to be externally mounted upon either a recessed or a non-recessed metal skin portion of the leading edge of a wing or other airfoil. As shown in FIG. 2, the apparatus 27 is mounted entirely within a recess 33 formed in the thin metal skin 34 (for example, .051" thick aluminum sheet) of the leading edge, so that the exposed outer surface of the apparatus 27 merges and is flush with the metal skin rearward of the recess. The apparatus is adhesively attached throughout its area to the metal skin 34; hence is fully backed and supported by such skin 34.

The apparatus 27 may be elongated, that is, longer than it is wide, and is pre-formed to a desired cross-sectional configuration designed to fit the surface to which it is to be attached. As shown in FIG. 2, the apparatus has a curved sectional shape substantially corresponding to that of the leading edge of the wing, and in its attached condition, the apparatus 27 together with the backing metal skin 34 constitutes a leading edge portion or structure which is integral with the remainder of the wing. The pre-formed apparatus 27 has a composite, integral, substantially rigid, sheet-like construction, and desirably a substantially uniform overall thickness approximately equal to that normally used for the backing metal skin 34. This overall thickness may be, for example, about 0.04 inches.

The apparatus or means 27 includes an outer protective cover or sheath 35 of stiff, high thermal conductivity material such, for example, as sheet aluminum alloy, stainless steel, magnesium alloy, or other suitable metallic or non-metallic material that is a good heat distributor and conductor, and resistant to abrasion and corrosion and the impact of rain drops, sleet and the like, and sufficiently stiff and strong for protective purposes. Good results are obtained using a sheet of stainless steel having a uniform thickness, for example, in the order of 0.005" to 0.010". The stainless steel sheet, as compared to the aluminum alloy sheet which may be about 0.015" to 0.025" thick, advantageously provides increased strength and resistance to deformation and abrasion, and provides improved heat flow and distribution to facilitate effective ice removal.

The invention includes a stiff plastic, integral, laminated, sheet-like heating structure of limited flexibility and preferably limited resiliency having therein electrical resistance heating elements 37 to 41, inclusive, each with a laterally or chordwise looped disposition sandwiched between continuous reinforcements 42, 43 of dielectric, heat-resistant fabric material. This plastic, laminated heating structure may have a substantially uniform overall thickness such, for example, as about 0.03" and is adhesively secured or bonded throughout its area directly to the metal inner surface of the overlying protective cover 35 in intimate heat-transmitting relation thereto.

The laminated heating structure comprises thermosetting, adhesive, plastic material 36 which must be an effective electrical insulator and also capable of conducting heat with minimum resistance or limited resistance only to the flow of heat. Preferably, this thermosetting adhesive, plastic material 36 has thermoplastic characteristics when heated to temperatures not in excess of 250° F., for example, but becomes a permanent thermosetting plastic when heated to temperatures in excess of 250° F., for example. It is important that this plastic material 36 has stability at high temperatures, stability and flexibility without cracking at below freezing temperatures, good film or sheet-forming characteristics and good handling ability for manufacturing purposes. Also, it must adhere securely to itself and to other metallic and non-metallic materials such, for example, as stainless steel, aluminum alloy and fiberglass fabric.

A preferred thermosetting, adhesive, plastic material 36 having the foregoing characteristics is a suitable mixture of nitrile rubber (a butadiene acrylonitrile copolymer) and an adhesive phenol formaldehyde resin together with suitable vulcanizing agents for the said nitrile rubber as is well-known in the art. The nitrile rubber provides limited resiliency and cushioning in the mixture when the latter is cured to a stiff or rigid state, and increases the adhesive characteristics of the mixture. The mixture can be produced in a liquid state (as a liquid cement), or in a solid but flexible state (as a thin sheet or film), or in a solid rigid state; hence it is highly suitable for use in manufacturing the apparatus.

Figure 3:
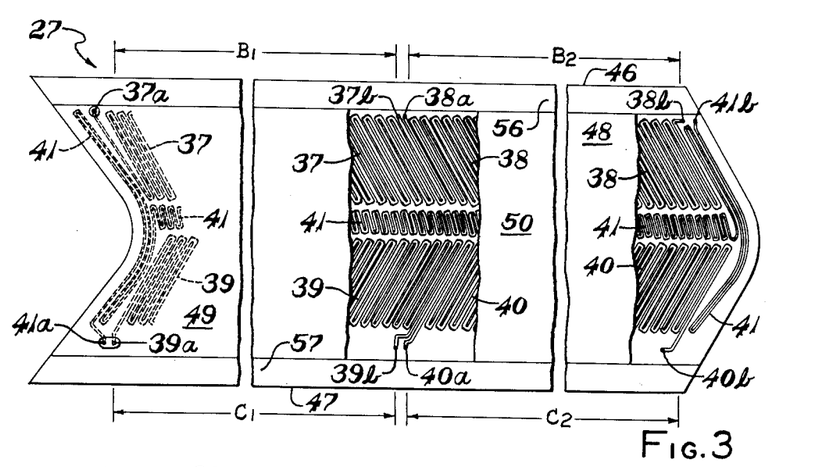
FIG. 3 is a plan view looking toward the inner face of the apparatus with the latter in a developed or flat condition.
Figures 5, 6:
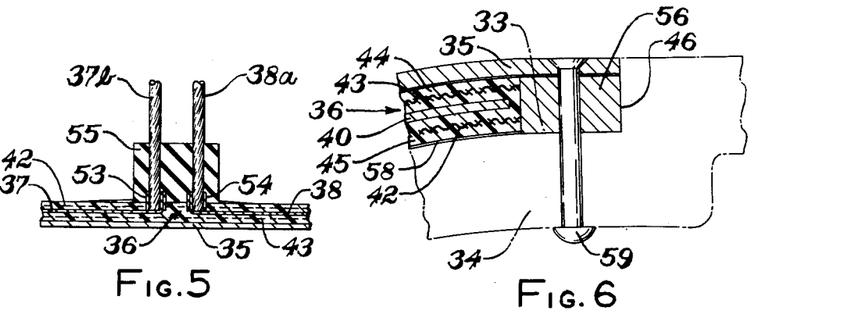
FIG. 5 is a sectional view in an enlarged scale of a dual lead-in wire connection to a pair of the ribbon-like heating elements in the apparatus, parts being broken away.
FIG. 6 is a sectional view in an enlarged scale of a lower attaching marginal portion of the mounted apparatus shown in FIG. 2, parts being broken away and broken lines indicating the recessed leading edge of the wing and attaching fastener means.

The plastic, laminated heating structure including therein the heating elements 37 to 41 of electrical resistance metal material which may be solid or stranded wire but are preferably ribbon-like long, thin, flat metal strip material, as shown especially in FIGS. 2, 3 and 6, has a thin, dielectric, outer thermal-conducting layer 44 including the thermosetting, adhesive, plastic material 36. This layer 44 is disposed between the ribbon-like heating elements 37 to 41 and the inner surface of the metal protective cover 35. The said heating structure also has a thin, dielectric, inner supporting layer 45 including the thermosetting, adhesive, plastic material 36 disposed between the ribbon-like heating elements 37 to 41 and the innermost surface of the heating structure remote from the metal protective cover 35. The inner supporting layer 45 may be of substantially the same thickness as the outer thermal-conducting layer 44.

The thin, outer thermal-conducting layer 44 effectively diffuses and rapidly conducts heat from the ribbon-like heating elements to the protective cover 35 with minimum barrier effect or resistance to the flow of heat; but maintains effectively its mechanical strength and its dielectric strength, that is, high resistance to electrical breakdown at the operating temperatures of the apparatus 27. The thin, inner supporting layer 45 functions primarily as an electrical insulator but only to a limited degree as a heat-barrier to reduce heat loss to the metal skin 34 of the leading edge of the wing. The inner supporting layer 45 maintains effectively its mechanical strength and its high dielectric strength at the operating temperatures of the apparatus 27.

An important essential feature of the invention is the provision of a continuous or single unitary reinforcement 43 of heat-resistant, dielectric fabric material embedded in the outer thermal-conducting layer 44, and a continuous or single unitary reinforcement 42 of similar fabric material embedded in the inner supporting layer 45. Desirably, each continuous reinforcement is located substantially midway the thickness of the layer in which it is embedded, thereby providing for intervening thermosetting, adhesive, plastic material 36 surrounding the ribbon-like heating elements disposed between the spaced reinforcements 42, 43. This arrangement produces increased mechanical structural strength and increased resistance to electrical breakdown of the apparatus. The preferred construction utilizes closely woven, square-woven, straight-laid fiberglass fabric for each reinforcement 42, 43, which fabric may have a thickness, for example, of about 0.003".

The fiberglass fabric sheets forming the reinforcements 42, 43 have limited give which permits their coaction with the limited resiliency of the said preferred thermosetting, adhesive, plastic material 36 to provide increased resistance to the impact of rain drops and the like against the apparatus. They advantageously protect the ribbon-like heating elements 37 to 41 against excessive thermal stresses and strains; increase the mechanical structural strength of the plastic, laminated heating structure; function primarily as an electrical insulator, hence provide increased dielectric strength; facilitate uniform thickness of the said heating structure; and eliminate effectively electrical short-circuiting of the ribbon-like heating elements by wholly preventing their contact with the metal protective cover 35, or with the metal skin 34 of the wing. The fiberglass fabric sheets 42, 43 coact to provide resistance to the shifting or mislocation of the ribbon-like heating elements during the manufacture of the apparatus and facilitate a smooth inner surface of the plastic laminated heating structure. The outer fiberglass fabric sheet 43 advantageously prevents migration or outward movement of the ribbon-like heating elements into contact with the metal protective cover 35 during the curing phases of manufacture, and also acts as a leveling medium for the adjacent thermosetting, adhesive, plastic material 36 to produce a uniformly thick, dielectric, thermal-conducting layer 44 adjacent the metal protective cover 35 capable of substantially uniform heat transmittal to such cover.

The heating elements 37 to 41, inclusive, are made of low, electrical resistance metal or of high, electrical resistance metal depending upon the apparatus heating requirements and the electrical power circuit to be used. For use of the apparatus in low voltage (100 v.), A.C. electrical power circuits, an aluminum bronze alloy or a Phosphor bronze alloy, for example, are suitable low, electrical resistance metals. For use of the apparatus in high voltage (200 v.), A.C. electrical power circuits, a nickel-chromium alloy or a nickel-chromium-iron alloy or a nickel-copper alloy, for example, are suitable high, electrical resistance metals. In the preferred construction embodying ribbon-like heating elements, rather than solid or standard wire heating elements, the desired construction and arrangement of all the heating elements 37 to 41, inclusive, are preferably produced in a single sheet of suitable resistance metal and suitable uniform thickness by means of a known photo-etching process, whereby separate joints or turns and soldered connections at the ends of adjacent chordwise-extending reaches or portions of each heating element are avoided. Good results are obtained when the ribbon-like heating elements are made from a sheet of stainless steel (nickel-chromium-iron alloy) having .005" thickness, if the apparatus is intended for use in a high voltage, power circuit.

Figure 3A:
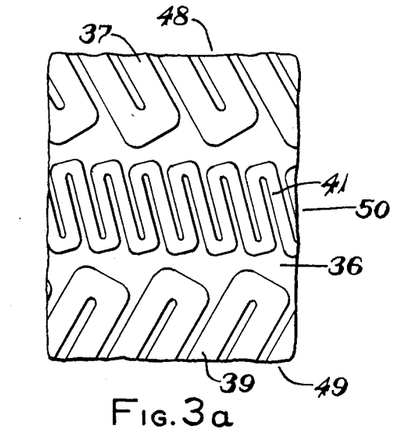
FIG. 3a is a fragmentary view in an enlarged scale of a central area of the apparatus shown in FIG. 3.

An important feature of the invention is that each unitary ribbon-like heating element is a continuous, single ribbon returned or looped upon itself so as to provide laterally disposed portions or reaches substantially in parallelism with adjacent portions or reaches in closed spaced relation throughout their length. Each heating element has a plurality or multiplicity of closed spaced, substantially parallel, interconnected, elongated portions or reaches disposed laterally or chordwise intermediate opposite longitudinal or spanwise-extending margins 46, 47 of the apparatus. Each heating element includes spanwise spaced terminal ends with the single unitary ribbon of that element being the sole heating element in the area of the heating structure between the terminals of that element as shown in FIG. 3. It is essential that each ribbon-like heating element have a narrow uniform width throughout the length of each chordwise portion and that the said width does not exceed approximately .30", so as to produce uniformity of heating and also to avoid objectionable localized hot spots caused by undue heating current density or concentration in the relatively short 180° turns or bends connecting adjacent ends of adjacent chordwise portions or reaches of the heating element. Heating current density hence heat input per unit area varies inversely as the radius from the center of the bend; consequently, the highest current density occurs in the region adjacent the inner edge of the bend and this produces an undesirable hot spot or zone at each said bend. To avoid such hot spots, each 180° bend or turn of the ribbon-like heating element is arcuate at its inner edge, but is non-arcuate with rounded corners at its outer edge, as shown in FIG. 3a. This configuration facilitates a relatively uniform distribution of the heat input throughout the turn including the heat produced by the heating current concentration adjacent the inner edge of the turn.

The closely spaced, substantially parallel, chordwise arrangement of adjacent interconnected portions or reaches of the respective ribbon-like heating elements is required to provide relatively short lengths of the reaches as compared to spanwise extending the full length of the apparatus, said adjacent portions or reaches being integral with, in continuation of, and connected by generally rounded bends or turn portions at their adjacent ends. This laterally looped construction advantageously accommodates limited thermal lengthening and contraction of the apparatus as a whole without shearing the bond of the ribbon-like heating elements to the adjacent thermosetting, adhesive, plastic material 36 and without buckling and breaking the ribbon-like heating elements.

The invention requires the use of the chordwise arrangement whether some or all the reaches of a heating element extend continuously from substantially the lower margin 47 to substantially the upper margin 46, or extend chordwise for only part of the width of the apparatus as shown especially in FIGS. 2 and 3. Also, the chordwise reaches of the heating elements may extend perpendicular to the longitudinal centerline of the apparatus in its developed or flat condition; or they may extend in angular relationship to such centerline as shown especially in FIG. 3, particularly when the area occupied by the heating element is of substantially parallelogrammic configuration as in apparatus for a swept-back airplane wing.

For the mounted condition of the apparatus upon the airfoil or wing, the chordwise reaches of the heating elements may, for some applications, be in angular relationship to the direction of flow of air across the wing; or they may be approximately parallel to said direction of airflow, as shown in FIG. 1.

The apparatus 27, although not necessarily limited thereto, has a pair of independent, laterally looped, ribbon-like heating elements 37, 38 and 39, 40, respectively, in series in each of its laterally or chordwise spaced-apart, rearward ice-shedding portions or areas 48, 49 having desirably a generally parallelogramic configuration in the developed condition shown in FIG. 3a. The portions 48, 49 each extend spanwise substantially the full length of the apparatus for positioning at the upper and lower aft or rearward regions, respectively, of the leading edge of the airfoil or wing. These rearward portions 48, 49 are sequentially heated intermittently and cyclically to remove ice-deposits thereon.

The preferred apparatus has a single ribbon-like heating element 41 including chordwise reaches thereof in its frontal anti-icing portion or area 50 occupying the narrow space between the rearward portions 48, 49 and extending longitudinally or spanwise substantially the full length of the apparatus for positioning at the immediate leading edge region (portion of sharpest curvature) of the airfoil. The frontal portion 50 is continuously heated for melting or preventing the formation of ice so as to maintain an ice-free gap between the ice-deposits on the rearward portions 48, 49 of the apparatus.

When stainless steel of .005" thickness is used for the ribbon-like heating elements, good results are obtained using a uniform width in the order of about .167" to .187", for example, for each heating element 37, 38, 39, 40 in the rearward ice-shedding portions 48, 49 with a uniform spacing or gap of about .03" to .04" between adjacent chordwise reaches of the element, whereby an intermittent heat dissipation of approximately 20 watts per square inch may be effected at the ice-shedding portions 48, 49 for ice-removal purposes. Also, good resutls are obtained using a uniform width of about .09", for example, for the heating element 41 in the frontal portion 50 with a uniform spacing or gap of about .03" to .04" between adjacent chordwise reaches of the element, whereby a continuous heat dissipation of approximately 15 watts per square inch may be effected at the frontal portion 50 for anti-icing purposes.

Figure 4:
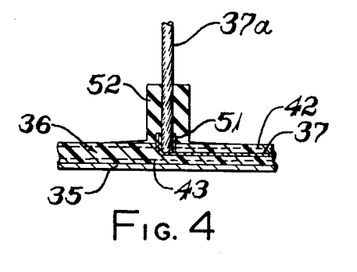
FIG. 4 is a sectional view in an enlarged scale of a single lead-in wire connection to a ribbon-like heating element in the apparatus, parts being broken away.

In the particular apparatus shown in FIG. 3, the continuous, laterally looped, ribbon-like heating element 37 occupies substantially one-half the length B1 and heating area of the upper, rearward ice-shedding portion 48 of parallelogrammic configuration, while the other heating element 38 occupies the other half of the length B2 and heating area of the portion 48. The chordwise-extending portions or reaches of both heating elements are angularly inclined in the same direction relative to the longitudinal centerline of the apparatus, whereby the heating elements conform to and occupy substantially the entire parallelogram-shaped heating area of the ice-shedding portion 48. The ribbon-like heating elements 39, 40 are similarly arranged but oppositely inclined in the respective half lengths C1 and C2 and heating areas in the lower, rearward ice-shedding portion 49. The heating elements 37 to 40, inclusive, are cyclically heated independently of one another and for this purpose, each is provided at its terminal ends with suitable external wire lead-in connections 37a and b, 38a and b, 39a and b, and 40a and b, respectively, as shown in FIGS. 3, 4 and 5. The arrangement facilitates uniformity of heating throughout the respective heating areas of the laterally spaced portions 48 and 49, respectively, and by virtue of sequential heating of said areas, reduces the electrical power requirements of the apparatus without reducing the watts per square inch heat dissipation at the rearward ice-shedding portions 48, 49.

It is essential that the laterally looped, single ribbon-like heating element 41 extend continuously the full spanwise length of the apparatus and occupy substantially the full width and entire area of the relatively narrow, frontal anti-icing portion 50. The chordwise reaches of the heating element 41 may be angularly inclined in the same direction as, but slightly less inclined than, the chordwise reaches of the heating elements 37, 38 in the upper, rearward ice-shedding portion 48. The short turns interconnecting adjacent chordwise reaches of the heating element 41 are closely adjacent and closely spaced from the adjacent turns in the heating elements 37 to 40, inclusive, so as to facilitate chordwise heat flow and avoid objectionable residual ice-deposits at the spanwise junctions of the frontal portion 50 with the rearward portions 48, 49 of the apparatus.

In the preferred construction shown in FIG. 3, the continuous heating element 41 has at least two chordwise reaches extending continuously from substantially the upper margin 46 to substantially the lower margin 47 and disposed intermediate the respective end reaches of the rearward heating elements 37 to 40 and the chordwise margins or ends of the apparatus. The ends of the ribbon-like heating element 41 are provided with suitable external wire lead-in connections 41a and 41b. This arrangement produces continuous uniform heat throughout the entire frontal portion 50 and in each of the narrow end zones extending chordwise substantially the full width of the apparatus even though the heating elements 37 to 40 are cyclically heated. This is advantageous to maintain a gap between the rearward ice-deposits and also to avoid residual ice-deposits at the end of the apparatus.

Each single lead-in connection 37a, 40b is constructed and arranged alike as shown in FIG. 4; hence, connection 37a only will be described. The single wire lead desirably of stranded wire overlaps an outwardly bent end portion of the ribbon-like heating element 37, and a metal sleeve 51 of brass surrounds the overlapped parts, which sleeve and overlapped parts are silver soldered together as by electrical brazing to form an electrical and mechanical connection. A shielding body 52 of molded rubber or of suitable thermosetting adhesive plastic material entirely encloses the brazed together parts, and its flanged base is adhesively secured to the adjacent face of the plastic, laminated structure of the apparatus.

Each duel lead-in connection 37b—38a, 38b—41b, 41a—39a and 39b—40a is constructed and arranged alike as shown in FIG. 5; hence, connection 37b—38a only will be described. The stranded wire lead is assembled with an outwardly bent end portion of the heating element 37 and with a suitable brass sleeve 53, and the assembly brazed together in the same manner as described above for the single lead-in connection 37a. The other stranded wire lead is assembled in like manner with and brazed to the outwardly bent end portion of the heating element 38 and a suitable brass sleeve 54. A suitable molded rubber or thermosetting adhesive plastic shielding body 55 entirely encloses and holds the two wire and sleeve assemblies upright in spaced-apart relation, and is adhesively secured at its flanged base to the adjacent face of the plastic, laminated structure.

Even though the apparatus is adhesively attached throughout to a recessed 34 or a non-recessed metal skin of the leading edge as by a thin film (about .006" thick) 58 of said nitrile rubber and phenolic resin mixture with thermoplastic characteristics, the preferred preformed apparatus construction may also provide a mechanical attachment along its spanwise margins. To this end, narrow attaching strips 56, 57 of aluminum alloy metal and suitable thickness extend along the spanwise margins of the apparatus in underlying relation to the protective cover 35 and in adhered abutting relation to the cover 35 and the spanwise marginal edges of the plastic laminated structure of the apparatus, as shown in FIGS. 2, 3 and 6. For attachment purposes, suitable spaced-apart fastener means 59, 59 which may be rivets, as shown, or screws, extend through the protective cover 35 and the attaching strips 56, 57 in contact therewith and contact and engage the metal skin 34 to further secure the apparatus to the leading edge. This particular mechanical attachment arrangement advantageously electrically grounds the metal, protective cover 35 through the attaching strips and rivets to the metal skin 34 of the leading edge, whereby static electricity is readily removed from the protective cover 35 of the apparatus and conducted to the structure of airfoil.

The thin, adhesive thermoplastic film 58 may be suitably heated safely to not in excess of 250° F. to secure the plastic laminated structure of the apparatus in all-over bonded relation to the metal skin 34. This heating does not destroy the thermoplastic property of the film 58 and permits removal of the apparatus as a whole from the leading edge, when desired, by removal of the fastener means 59, 59 and by subsequently heating the apparatus including the film 58 to a temperature substantially in excess of 160° F. but not greater than 250° F., which heating softens the film and facilitates easily breaking its adhesive bond to the metal skin 34.

In the preferred operation of the pre-formed apparatus 27 mounted on the leading edge, the laterally looped, ribbon-like heating element 41 is electrically heated continuously so as to provide, for example, approximately 15 watts per square inch heat dissipation uniformly throughout the entire length and area of the frontal anti-icing portion 50, thereby maintaining the outer surface of such portion at a sufficient temperature so that it is kept entirely free from ice-deposits. The metal protective cover 35 readily conducts heat transmitted to it from the heating element 41 and facilitates substantial uniform distribution of the transmitted heat throughout the frontal portion 50 and to a limited extent chordwise beyond the spanwise margins of the portion 50. The laterally extending, increased length, end reaches of the heating element 41 advantageously maintain the narrow end zones of the apparatus 27 free from ice-deposits across its full width.

The respective laterally looped, ribbon-like heating elements 37 to 40 in the rearward ice-shedding portions 48, 49 are electrically heated cyclically and sequentially from the outboard end to the inboard end of the apparatus 27. One sequence of heating may be, for example, as follows:

The heating element 38 may be electrically heated first to provide about 20 watts per square inch heat dissipation, thus heating the metal outer surface of the outboard half of the area (length B2) of the upper, rearward ice-shedding portion 48 to a temperature sufficient to cause thermal expansion and cracking of the overlying ice-deposit and also a liquid interface between the metal outer surface and the ice, whereby the flow of ambient air removes effectively the ice-deposit at one-half the portion 48. Chordwise heat flow in the protective cover 35 facilitates removal of the ice at the upper attaching margin of the apparatus. This heating of the element 38 is of short duration such, for example, as 20 seconds.

The heating element 40 may be electrically heated next for 20 seconds to provide about 20 watts per square inch heat dissipation throughout the outboard half of the area (length C2) of the lower, rearward ice-shedding portion 49. Then the heating element 37 may be electrically heated correspondingly throughout the remainder or inboard half of the area (length B1) of the upper, rearward ice-shedding portion 48. Lastly, the heating element 39 may be electrically heated correspondingly throughout the remainder or inboard half of the area (length C1) of the lower, rearward ice-shedding portion 49. This cyclical heating of the elements 37 to 40 is effective to remove the ice-deposits on the portions 48, 49, and rapidly raises the temperature of both the metal protective cover 35 and the plastic, laminated structure underlying the cover to above freezing temperature. However, the maximum temperature, for example, 160° F. permitted at the innermost face of the plastic, laminated structure in the 20 second heating period is not sufficient to soften the thermoplastic film 58 enough to break the adhesive bond of the apparatus 27 to the metal skin 34 of the leading edge.

Thus, the apparatus 27 not only prevents effectively the accumulation of ice on the leading edge, but resists abrasion and electrical break-down. It also resiliently absorbs to a limited extent the impact of rain drops, hail and ice particles, and the like against the apparatus in its mounted condition.

Figure 7:
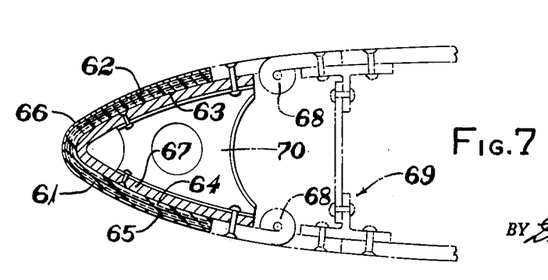
FIG. 7 is a cross-sectional view showing an individual, electrically heated leading edge portion adapted to replace the normally used metal skin of the leading edge of an airfoil, broken lines showing other parts of the remainder of the airfoil.

The composite construction shown in FIG. 7 is an individual leading edge portion 60 of an airfoil including a modification of the electrically heated apparatus 27, which portion 60 is adapted to replace the all-metal skin normally used to form the leading edge of the airfoil. The modified electrically heated apparatus is constructed and arranged like the apparatus 27 except that the dielectric outer thermal-conducting layer 61 of suitable thermosetting adhesive plastic material with a suitable closely woven fiberglass fabric reinforcement 62 therein is thinner (about .008 inch thick) than the dielectric inner supporting layer 63 (about .013 inch thick) of suitable thermosetting adhesive plastic material with a suitable closely woven fiberglass fabric reinforcement 64 therein. This provides increased thickness; hence, increased mechanical structural strength of the plastic laminated heating structure. Stainless steel of .005 inch thickness may be used for the heating elements 65, and a stainless steel sheet of about .005 inch thickness may be used for the outer protective cover 66.

The inner supporting layer 63 of the plastic, laminated heating structure is suitably bonded to and backed by a thin, inner support member 67 of suitable aluminum alloy (about .025 inch uniform thickness) which may be provided with suitable means or extensions beyond the ends of the protective cover 66 and the plastic laminated heating structure. These extensions are attached as by rivets to separable hinge connectors 68, 68 suitably secured as by rivets to the remainder of the airfoil structure 69. Suitable spanwise spaced-apart, flanged ribs 70, 70 of aluminum alloy may be suitably secured to the individual leading edge portion 60 in backing, supporting relation to the inner support member 67 as shown in FIG. 7.

The thin composite construction of the individual, electrically heated, leading edge portion 60 has been found to have a stiffness and resistance to deformation at least equal to that of an aluminum skin of .051 inch thickness generally used to form and constitute the leading edge of an airfoil such as a wing. The composite leading edge portion 60 has approximately the same weight, without sacrifice of strength, as the aluminum leading edge skin normally used; consequently, the incorporation of the electrically heated apparatus as an integral part of such portion 60 does not increase the weight of the leading edge of the airfoil, while providing means for removing ice-deposits therefrom. The composite leading edge portion 60 being separably attached by the hinge connectors 68, 68, is readily replaced as a whole in case of damage or failure of the plastic laminated heating structure. This is advantageous for service purposes.

Variations may be made without departing from the scope of the invention as it is defined in the following claims.

I claim:

1. Electrically heated apparatus for preventing the accumulation of ice upon the leading edge of an airfoil, said apparatus comprising a thin outer protective cover of high thermal conductivity sheet metal on the outer face of which the ice accumulates, a relatively thicker, stiff plastic, integral, laminated sheet-like heating structure including thermosetting adhesive plastic material with thermal-conducting and electrical insulator characteristics adhesively bonded throughout to substantially the entire inner face of said outer protective cover, the united protective cover and heating structure being of a curved cross-sectional configuration adapted for conformance and adhered attachment throughout to the leading edge skin of an airfoil and including chordwise spaced-apart rearward ice-shedding portions and a frontal anti-icing portion, said heating structure comprising a thin outer dielectric thermal-conducting layer including said plastic material nearest said protective cover, an intermediate layer of heating elements of electrical resistance metal adhesively bonded to said thermal-conducting layer, and a thin inner dielectric supporting layer including said plastic material adhesively bonded to said outer layer and said heating elements, said intermediate layer comprising a plurality of continuous ribbon-like heating elements occupying substantially the entire areas of said rearward ice-shedding portions and a continuous single ribbon-like heating element occupying substantially the entire area of said frontal anti-icing portion, each ribbon-like heating element in each of said portions comprising a single ribbon looped upon itself providing a plurality of closely spaced, substantially parallel, interconnected, elongated ribbon-like reaches with broad surfaces facing said cover and with said reaches extending continuously chordwise substantially the full chordwise extent of the portion, and means for connecting each ribbon-like heating element to an electrical circuit to effect heating of said protective cover throughout all said portions of the apparatus.

2. Electrically heated apparatus as defined in claim 1 in which said outer dielectric thermal-conducting layer of said heating structure has imbedded therein at a position closely spaced from said broad surfaces of the ribbon-like heating elements and from said cover a continuous heat-resistant dielectric woven fiberglass fabric reinforcement, and in which said inner dielectric supporting layer has imbedded therein at a position closely spaced from the other broad surfaces of said ribbon-like heating elements a second continuous heat-resistant dielectric woven fiberglass fabric reinforcement, whereby electrical contact of said ribbon-like heating elements with said protective cover and said leading edge skin of the airfoil is prevented and increased structural strength and stiffness of the united protective cover and heating structure are provided when the apparatus is attached to the airfoil.

3. In an airfoil including electrically heated apparatus for preventing the accumulation of ice upon the leading edge of the airfoil, in combination, a thin outer protective cover of stiff, high thermal conductivity metal extending across and to the rear of the leading edge, a relatively thicker, stiff plastic, integral, laminated sheet-like heating structure underlying and adhesively attached throughout to said protective cover in intimate heat-conducting relation thereto, and a thin inner support member of stiff metal backing and adhesively attached to the innermost face of said heating structure throughout the entire area thereof in supporting relation thereto, the united protective cover and heating structure and support member being of curved cross-sectional configuration so as to constitute the leading edge structure of the airfoil with chordwise-spaced rearward ice-shedding areas and a frontal anti-icing area therebetween, and means engaging said support member securing the same to the remainder of said airfoil, said heating structure comprising thermosetting adhesive plastic material having thermal-conducting and electrical insulator characteristics; a pair of spaced-apart continuous reinforcements of woven fiberglass fabric imbedded in and bonded to said plastic material intermediate the thickness of said heating structure, and an intermediate layer of heating elements of electrical resistance metal imbedded in and bonded to said plastic material between said reinforcements, each heating element comprising a single ribbon looped upon itself providing a plurality of chordwise-extending, closely spaced, substantially parallel, interconnected, elongated ribbon-like reaches with broad surfaces facing said protective cover, said heating elements comprising a pair of said heating elements including said chordwise-extending reaches thereof disposed in spanwise series in each of the rearward ice-shedding areas of said leading edge structure and a single heating element including said chordwise-extending reaches thereof disposed in the frontal anti-icing area of the leading edge structure, and means for individually connecting each said heating element to an electrical circuit.

4. Electrically heated apparatus for preventing the accumulation of ice upon the leading edge of an airfoil, said apparatus comprising a thin outer protective cover of high thermal-conductivity metal upon which the ice accumulates, a relatively thicker, stiff plastic, integral, laminated sheet-like heating structure including thermosetting adhesive plastic material having thermal-conducting and electrical insulator characteristics adhesively secured throughout to the inner face of said protective cover, the united protective cover and heating structure being of curved cross-sectional configuration for constituting at least in part the leading edge structure of an airfoil and including chordwise spaced-apart rearward areas with a relatively narrow frontal area therebetween, said heating structure including at each of said areas at least one continuous ribbon-like heating element of electrical resistance metal spaced from said protective cover and disposed intermediate the thickness of said heating structure with thin dielectric layers of said plastic material united with and overlying and underlying all the heating elements, each heating element comprising a single ribbon looped upon itself providing a plurality of closely spaced, substantially parallel, interconnected, elongated ribbon-like portions extending chordwise throughout the major part of the chordwise extent of the area in which the heating element is located with broad surfaces of the ribbon-like portions facing said protective cover, and means for connecting said ribbon-like heating elements to an electrical circuit.

5. Electrically heated apparatus for preventing the accumulation of ice upon the leading edge of an airfoil, said apparatus comprising a thin outer protective cover of high thermal conductivity sheet metal on the outer face of which the ice accumulates, a relatively thicker, stiff plastic, integral, laminated sheet-like heating structure including thermosetting adhesive plastic material with thermal-conducting and electrical insulator characteristics adhesively secured throughout to substantially the entire inner face of said outer protective cover, the united protective cover and heating structure being of a curved cross-sectional configuration adapted for conformance and adhered attachment throughout to the leading edge skin of an airfoil and including chordwise spaced-apart rearward ice-shedding portions and a frontal anti-icing portion, each of said rearward ice-shedding portions being of generally parallelogrammic configuration in the developed condition of the apparatus, said heating structure comprising a thin outer dielectric thermal-conducting layer including said plastic material nearest said protective cover, an intermediate layer of heating elements of electrical resistance metal secured to said thermal conducting layer, and a thin inner dielectric supporting layer including said plastic material secured to said outer layer and said heating elements, said intermediate layer of heating elements comprising a pair of individual ribbon-like heating elements disposed in spanwise series in each of said rearward ice-shedding portions and occupying substantially the entire area thereof and a single ribbon-like heating element occupying substantially the entire area of said frontal anti-icing portion, each ribbon-like heating element in each said portion comprising a single ribbon looped upon itself providing a plurality of closely spaced, substantially parallel, interconnected, elongated ribbon-like reaches with broad surfaces facing said protective cover and extending continuously chordwise substantially the full chordwise extent of the portion, the chordwise-extending reaches of the heating elements in said parallelogrammic rearward ice-shedding portions being inclined relative to the spanwise centerline of the developed apparatus and substantially parallel with the inclined ends of said parallelogrammic rearward ice-shedding portions, and means for connecting each ribbon-like heating element to an electrical circuit to effect heating of said protective cover throughout all said portions of the apparatus.

6. Electrically heated apparatus for preventing the accumulation of ice upon the leading edge of an airfoil, said apparatus comprising a thin outer protective cover of stiff, high thermal conductivity metal on which the ice accumulates, a relatively thicker, stiff plastic, integral, laminated sheet-like heating structure including a thermosetting adhesive plastic material comprising a mixture of a nitrile rubber and an adhesive phenol formaldehyde resin which mixture has thermal-conducting and electrical insulator and limited flexibility and resiliency characteristics in the vulcanized state, said heating structure including a pair of continuous spaced-apart reinforcements of closely woven square-woven straight-laid fiberglass fabric embedded in said plastic material intermediate the thickness of said heating structure and an intermediate layer of individual ribbon-like heating elements of electrical resistance metal in the plastic material between said reinforcements, said heating elements occupying substantially the entire area of said heating structure and each being of uniform width and thickness throughout its length with a uniform width not greater than approximately 0.30 inch, each heating element comprising a single ribbon looped upon itself providing a plurality of closely spaced, substantially parallel, interconnected, elongated ribbon-like reaches with broad surfaces facing said cover and extending chordwise of the apparatus with a spacing between adjacent chordwise reaches of the heating element in the order of 0.03 inch to 0.04 inch and each turn interconnecting the adjacent ends of adjacent chordwise reaches of the heating element being arcuate at its inner edge and non-arcuate with rounded corners at its outer edge, and means for connecting each heating element to an electrical circuit.

7. Electrically heated apparatus for preventing the accumulation of ice upon the leading edge of an airfoil, said apparatus comprising a thin outer protective cover of stiff, high thermal conductivity stainless steel of uniform thickness in the order of 0.005 inch to 0.010 inch on which cover the ice accumulates, a relatively thicker, stiff plastic, integral, laminated sheet-like heating structure including a thermosetting adhesive plastic material comprising a mixture of a nitrile rubber and an adhesive phenol formaldehyde resin which mixture has thermal-conducting and electrical insulator and limited flexibility and resiliency characteristics in the vulcanized state, said heating structure being of uniform overall thickness of about 0.03 inch and including a pair of continuous spaced-apart reinforcements of closely woven square-woven straight-laid fiberglass fabric embedded in said plastic material intermediate the thickness of said heating structure and an intermediate layer of individual ribbon-like heating elements of electrical resistance stainless steel in the plastic material between said reinforcements, said heating elements occupying substantially the entire area of said heating structure and each being of 0.005 inch uniform thickness with a uniform width in the order of about 0.09 inch to about 0.167 inch, each heating element comprising a single ribbon looped upon itself providing a plurality of closely spaced, substantially parallel, interconnected, elongated ribbon-like reaches with broad surfaces facing said cover and extending chordwise of the apparatus, and means for connecting each heating element to an electrical circuit.

8. An individual electrically heated leading edge portion for attachment to an airfoil comprising a thin outer protective cover of stiff, high thermal conductivity metal, a relatively thicker, stiff plastic, integral, laminated sheet-like heating structure underlying and adhesively attached throughout to said protective cover in intimate heat-conducting relation thereto, and a thin inner support member of stiff metal backing and adhesively attached to said heating structure throughout the entire area thereof in supporting relation thereto, the united protective cover and heating structure and support member being of curved cross-sectional configuration to constitute the leading edge of an airfoil and including means for securing the leading edge portion to the remainder of the airfoil and providing chordwise spaced-apart rearward ice-shedding areas and a frontal anti-icing area therebetween, said heating structure including thermosetting adhesive plastic material comprising a mixture of nitrile rubber and an adhesive phenol formaldehyde resin which mixture has thermal-conducting and electrical insulator and limited flexibility and resiliency characteristics in the vulcanized state, and said heating structure including individual ribbon-like heating elements of electrical resistance metal in said areas and disposed intermediate the thickness of said structure, an outer dielectric thermal-conducting layer of said plastic material overlying and united with all said heating elements and an inner dielectric supporting layer of said plastic material underlying and united with all said heating elements, each heating element comprising a single continuous ribbon looped upon itself providing a plurality of closely spaced, substantially parallel, interconnected, elongated portions extending chordwise of the said leading edge portion, and means for connecting said heating elements individually to an electrical circuit.

9. An individual leading edge portion for removable atachment to an airfoil comprising a thin outer protective cover of stiff, hard, corrosion and abrasion-resistant metal, a relatively thicker, stiff plastic, integral, sheet-like laminated structure backing and adhesively united to said protective cover throughout substantially the entire area thereof, and an inner support member of metal with a thickness in the order of that of the laminated structure backing and adhesively united throughout to said laminated structure and including spaced bracing means united with said support member to stiffen the same against distortion, the united protective cover and laminated structure and support member being of curved cross-sectional configuration to constitute an individual leading edge portion of an airfoil and including means for removably securing the spanwise margins of said leading edge portion to the adjacent rear portion of the airfoil, said laminated structure including cured thermosetting plastic material with a plurality of superimposed spaced unitary reinforcing layers of fiberglass fabric imbedded in and bonded to said plastic material intermediate the thickness of said structure and extending throughout substantially the entire length and width of said structure to maintain substantially uniform spacing between said protective cover and said support member and to provide additional mechanical strength of the said united protective cover and laminated structure and support member.

10. Electrically heated apparatus for preventing the accumulation of ice upon a contoured surface, said apparatus comprising a thin outer protective cover of stiff high thermal conductivity metal upon which ice deposits, a relatively thicker laminated heating structure including a plurality of heating elements of electrical resistance metal disposed between an outer and an inner layer of dielectric thermal conducting thermosetting plastic material with the heating elements disposed throughout substantially the entire length and width of the heating structure, the said layers of thermosetting plastic material being united with each other and to said protective cover as a unitary assembly which is of a contoured cross-sectional configuration substantially corresponding to said contoured surface for attachment to the latter surface in conformance therewith, each of said heating elements comprising a single unitary element comprising a plurality of spaced substantially parallel portions each connected at one end to an end of one adjacent portion and at the other end to an end of the other adjacent portion, the spacing between said portions being substantially less than the length of each portion while the length of each portion is substantially less than the largest dimension of said apparatus, each heating element including spaced terminals and being the sole heating element in the area of the heating structure between the terminals of that element, and means for connecting said heating element terminals to an electrical circuit.

11. Electrically heated apparatus as defined in claim 10 in which said outer layer of said heating structure includes a single unitary heat-resistant dielectric fabric reinforcement extending throughout substantially the entire length and width of the heating structure and bonded to said plastic material and closely spaced from said cover and from all said heating elements, and in which said inner layer of said heating structure includes a single unitary heat-resistant dielectric fabric reinforcement extending throughout substantially the entire length and width of the heating structure and bonded to said plastic material and closely spaced from all said heating elements, whereby electrical contact of said heating elements with said protective cover and said contoured surface is prevented and increased structural strength of the united heating structure and protective cover is provided when the apparatus is mounted upon the contoured surface.

12. Electrically heated apparatus for preventing the accumulation of ice upon the leading edge of an airfoil, said apparatus comprising a thin outer protective cover of stiff corrosion and abrasion-resistant high thermal conductivity metal upon which ice deposits, a relatively thicker integral laminated heating structure underlying and adhesively secured throughout to said protective cover in face-to-face heat-transferring contact therewith, the united protective cover and heating structure being of curved cross-sectional configuration substantially corresponding to the configuration of the leading edge surface of an airfoil for attachment to the latter surface in conformance therewith, said heating structure including a plurality of ribbon heating elements of electrical resistance metal disposed between and bonded to an outer and an inner layer of thermosetting plastic material having thermal-conducting and electrical insulator characteristics, a single unitary reinforcement of closely woven square-woven straight-laid fiberglass fabric embedded in each of said layers of said thermosetting plastic material and extending throughout substantially the entire length and width of said heating structure, each of said heating elements comprising a single unitary ribbon looped upon itself providing a plurality of closely spaced substantially parallel interconnected elongated portions with broad surfaces facing said cover and extending chordwise of the apparatus intermediate opposite spanwise margins thereof with the spacing between the elongated portions substantially less than the length of each portion, each heating element including spanwise spaced terminals with the single unitary ribbon of that element being the sole heating element in the area of the heating structure between the terminals of that element, and means for connecting said heating element terminals to an electrical circuit.

13. An individual electrically heated leading edge portion for removable attachment to an airfoil comprising a thin outer protective cover of stiff high thermal conductivity metal upon which ice deposits, a relatively thicker laminated heating structure including a plurality of ribbon heating elements of electrical resistance metal disposed intermediate an outer and an inner layer of dielectric thermal conducting thermosetting plastic material with the heating elements disposed throughout substantially the entire length and width of the heating structure, an inner support member of stiff metal having a thickness in the order of that of said heating structure underlying and supporting the said heating structure throughout the entire area thereof, the said layers of thermosetting plastic material being united with each other and to said protective cover and said support member as a unitary assembly which is of curved cross-sectional configuration to constitute an individual leading edge portion of an airfoil, each of said heating elements comprising a single unitary ribbon looped upon itself providing a plurality of closely spaced substantially parallel interconnected elongated portions with broad surfaces substantially parallel to said protective cover and extending chordwise of the said individual leading edge portion intermediate opposite spanwise margins thereof with the spacing between the elongated portions substantially less than the length of each portion, each heating element including spaced terminals with the single unitary ribbon of that element being the sole heating element in the area of the heating structure between the terminals of that element, means for connecting said heating element terminals to an electrical circuit, and means for removably securing said leading edge portion to the adjacent rearward structure of the airfoil.

14. An individual electrically heated leading edge portion for removable attachment to an airfoil comprising a thin outer protective cover of stiff, high thermal conductivity metal upon which ice deposits, a relatively thicker laminated heating structure including a plurality of ribbon heating elements of electrical resistance metal disposed intermediate an outer and an inner layer of dielectric thermal conducting thermosetting plastic material with the heating elements located throughout substantially the entire length and width of the heating structure, and an inner support member of stiff metal having a thickness in the order of that of said heating structure underlying and supporting the said heating structure throughout the entire area thereof, the said layers of thermosetting material being united with each other and to said protective cover and said support member as a unitary assembly which is of curved cross-sectional configuration to constitute an individual leading edge portion of an airfoil, the said outer and inner layers of plastic material each including intermediate its thickness and spaced from said heating elements a single unitary woven fiberglass fabric reinforcement extending throughout substantially the entire length and width of the heating structure, each of said heating elements comprising a single unitary ribbon looped upon itself providing a plurality of closely spaced substantially parallel interconnected elongated portions with broad surfaces substantially parallel to said protective cover and extending chordwise of the said individual leading edge portion intermediate opposite spanwise margins thereof with the spacing between the elongated portions substantially less than the length of each portion, each heating element including spaced terminals with the single unitary ribbon of that element being the sole heating element in the area of the heating structure between the terminals of that element, means for connecting said heating element terminals to an electrical circuit, spaced bracing means united with said inner support member for backing and stiffening the united protective cover and heating structure and support member against distortion, and means for removably securing said leading edge portion to the adjacent rearward structure of the airfoil.

15. An individual electrically heated leading edge portion for removable attachment to an airfoil comprising a thin outer protective cover of stiff substantially uniform thickness high thermal conductivity metal upon which ice deposits, a relatively thicker laminated heating structure of substantially uniform thickness including a plurality of ribbon heating elements of electrical resistance metal intermediate an outer and an inner layer each of substantially uniform thickness and of dielectric thermal conducting thermosetting plastic material with the heating elements disposed throughout substantially the entire length and width of the heating structure, an inner support member of stiff substantially uniform thickness metal having a thickness in the order of that of the heating structure underlying and supporting said heating structure throughout the entire area thereof, the said layers of thermosetting plastic material being united with each other and said heating elements and to said protective cover and said support member as a unitary assembly which is of curved cross-sectional configuration to constitute an individual leading edge portion of an airfoil, means comprising marginal portions of said inner support member projecting beyond said heating structure for removably securing the said individual leading edge portion to the adjacent rearward structure of the airfoil, each of said heating elements being of substantially uniform thickness and comprising a single unitary ribbon looped on itself providing a plurality of closely spaced substantially parallel interconnected elongated portions with broad surfaces facing said protective cover and extending chordwise of the said individual leading edge portion intermediate opposite spanwise margins thereof with the spacing between said elongated portions substantially less than the length of each portion, each heating element including spanwise spaced terminals with the single unitary ribbon of that element being the sole heating element in the area of the heating structure between the terminals of that element, and means for connecting said heating element terminals to an electrical circuit.

16. Electrically heated apparatus for preventing the accumulation of ice upon a contoured surface, said apparatus comprising a stiff, heat-conducting outer protective cover upon which ice deposits, a stiff, heat-conducting, electrically-insulating laminated heating structure in face-to-face heat-transferring contact with said protective cover, said heating structure including a plurality of unitary heating elements of electrical resistance metal each with spaced terminals and disposed between an outer and an inner layer of dielectric thermal-conducting cured thermosetting plastic material with the heating elements disposed throughout substantially the entire area of the heating structure, the said layers of cured thermosetting plastic material being united with each other and to said protective cover as a unitary assembly which is of a contoured cross-sectional configuration substantially corresponding to said contoured surface for attachment to the latter surface in conformance therewith, each of said unitary heating elements extending throughout the major part of an area to be heated in said heating structure and comprising a plurality of spaced substantially parallel interconnected portions with the spacing between said portions being substantially less than the length of each portion and the said length of each portion being substantially less than the largest dimension of said apparatus, and means for connecting said heating element terminals to an electrical circuit.

17. Electrically heated apparatus as defined in claim 16 in which said outer layer of said heating structure includes a heat-resistant dielectric single thickness fabric reinforcement extending throughout substantially the said entire area of said heating structure and bonded to said plastic material and closely spaced from said protective cover and from all said heating elements, whereby electrical contact of said heating elements with said protective cover is prevented and increased structural strength of the united heating structure and protective cover is provided when the apparatus is mounted upon the contoured surface.

18. Electrically heated apparatus as defined in claim 16 in which said outer layer of said heating structure includes a heat-resistant dielectric single thickness fabric reinforcement extending throughout substantially the said entire area of said heating structure and bonded to said plastic material and closely spaced from said protective cover and from all said heating elements, and in which said inner layer includes a heat-resistant dielectric single thickness fabric reinforcement extending throughout substantially the said entire area of said heating structure and bonded to said plastic material and closely spaced from all said heating elements, whereby electrical contact of said heating elements with said protective cover and said contoured surface is prevented and increased structural strength of the united heating structure and protective cover is provided when the apparatus is mounted upon the contoured surface.

19. Electrically heated apparatus as defined in claim 16 in which said protective cover is of sheet configuration and said heating structure is of sheet configuration with one of its main surfaces bonded by said cured thermosetting plastic material to said protective cover in face-to-face heat-transferring contacting relationship, and in which each of said heating elements is a thin narrow single unitary ribbon of said electrical resistance metal with a face of each of the said ribbons uniformly spaced from said protective cover and from said one main surface of said heating structure.

References Cited in the file of this patent
UNITED STATES PATENTS

| | | |
|---|---|---|
| 1,963,554 | McDill | June 19, 1934 |
| 2,106,323 | Huntington | Jan. 25, 1938 |
| 2,393,635 | Hubbard | Jan. 29, 1946 |
| 2,401,247 | Hunter | May 28, 1946 |
| 2,464,273 | Tanchel | Mar. 15, 1949 |
| 2,564,325 | Coonly | Aug. 14, 1951 |
| 2,566,921 | Briscoe | Sept. 4, 1951 |
| 2,599,059 | Jones | June 3, 1952 |
| 2,710,909 | Logan et al. | June 14, 1955 |
| 2,719,907 | Combs | Oct. 4, 1955 |
| 2,741,692 | Luke | Apr. 10, 1956 |
| 2,757,273 | Taylor | June 31, 1956 |
| 2,762,897 | Vrooman et al. | Sept. 11, 1956 |
| 2,784,287 | Glynn | Mar. 5, 1957 |

FOREIGN PATENTS

| | | |
|---|---|---|
| 740,551 | Great Britain | Nov. 16, 1955 |

UNITED STATES PATENT OFFICE
CERTIFICATE OF CORRECTION

Patent No. 2,992,317                                      July 11, 1961

Olin Miller Hoffman

It is hereby certified that error appears in the above numbered patent requiring correction and that the said Letters Patent should read as corrected below.

Column 5, lines 19 and 20, strike out "unitary", line 20, after "single" insert -- unitary --; lines 23 and 25, for "closed", each occurrence, read -- closely --; column 6, lines 46 and 47, for "resutls" read -- results --.

Signed and sealed this 10th day of April 1962.

(SEAL)
Attest:

ERNEST W. SWIDER                                    DAVID L. LADD Attesting Officer                                          Commissioner of Patents